(12) United States Patent
Porter et al.

(10) Patent No.: US 8,978,710 B2
(45) Date of Patent: Mar. 17, 2015

(54) PNEUMATIC INSULATING DEVICE

(75) Inventors: David John Porter, Wiltshire (GB); Matthew Stubbs, Wiltshire (GB)

(73) Assignee: Tyco Electronics UK Ltd., Swindon, Wiltshire (GB)

( * ) Notice: Subject to any disclaimer, the term of this patent is extended or adjusted under 35 U.S.C. 154(b) by 1040 days.

(21) Appl. No.: 12/737,326

(22) PCT Filed: Jun. 15, 2009

(86) PCT No.: PCT/GB2009/050673
§ 371 (c)(1), (2), (4) Date: Dec. 30, 2010

(87) PCT Pub. No.: WO2010/001145
PCT Pub. Date: Jan. 7, 2010

(65) Prior Publication Data
US 2011/0094611 A1   Apr. 28, 2011

(30) Foreign Application Priority Data

Jul. 1, 2008 (GB) .................................. 0811953.9

(51) Int. Cl.
*F16L 3/00* (2006.01)
*B60L 5/32* (2006.01)

(52) U.S. Cl.
CPC ........................................ *B60L 5/32* (2013.01)

USPC .......................................... 138/106; 138/178

(58) Field of Classification Search
USPC ......................................... 138/106, 177, 178
See application file for complete search history.

(56) References Cited

U.S. PATENT DOCUMENTS 5,531,301 A * 7/1996 Makino et al. .................. 191/55
5,584,369 A * 12/1996 Makino et al. .................. 191/55

FOREIGN PATENT DOCUMENTS

| DE | 34 26 537 A1 | 1/1986 |
| GB | 1 167 576 A | 10/1969 |

OTHER PUBLICATIONS

International Search Report for PCT/GB2009/050673 issued by the European Patent Office on Sep. 14, 2009.

* cited by examiner

*Primary Examiner* — Patrick F Brinson
(74) *Attorney, Agent, or Firm* — Faegre Baker Daniels LLP

(57) ABSTRACT

An pneumatic insulating device (20) is disclosed comprising: a load bearing body, top (24) and bottom parts connected to the load bearing body; and a coiled, insulating pneumatic line (14, 14') connect to and passing though the top and bottom parts, characterised by both the top and the bottom parts have fixing means (21) for fixing the device between external fixtures.

10 Claims, 3 Drawing Sheets

PNEUMATIC INSULATING DEVICE

This invention relates to a pneumatic insulating device comprising a body; top and bottom parts connected to the body; and a coiled, insulating pneumatic line connecting and passing though the top and bottom parts.

FIG. 1 is a section through a conventional such pneumatic insulating device 10 comprising a cylindrical PET core 11 connected to flat, machined top and bottom parts 12, 13. For simplicity, the means to connect the top and bottom parts to the core is omitted from FIG. 1, but would include bolts, recessed in the top and bottom parts and anchored to threaded bores in the core.

Insulating, pneumatic lines 14, 14' are helically coiled around the core and connected to the top and bottom parts. The bottom part 13 has a flanged, flat surface for mounting the device on a supporting substrate (not shown). The top part 12 is configured such that the pneumatic lines pass though it at locations 15, 15' on the flat section and the bottom part is configured such that the pneumatic lines pass though it at locations 16, 16' on the flanged section. Surrounding the core and the pneumatic lines 14, 14' is a sheath 17 and an outer body 18 supporting annular cooling fins 19. The helical coiling of the insulating pneumatic lines provides for a length of pneumatic line which is much longer than the overall dimensions of the pneumatic insulating device, thereby resulting in a higher breakdown voltage along the pneumatic line than would otherwise be the case.

In accordance with the present invention, there is provided a pneumatic insulating device comprising: a load bearing body; top and bottom parts connected to the load bearing body; and a coiled, insulating pneumatic line connect to and passing though the top and bottom parts, characterised by both the top and bottom parts have fixing means for fixing the device between external fixtures.

The inventors have realised that it is possible to use such a pneumatic insulating device as a load bearing member. For example, the bottom part can be mounted on a supporting substrate and the top part can be connected to and support an external fixture, especially one requiring an insulated pneumatic feed such as a pantograph for collecting electric current from overhead lines for electric trains or trams.

One or both of the top or and bottom parts may have fixing means including a flat surface for abutting the device to an external fixture. This may be a flanged flat surface and where it is, the or each part with such a flanged flat surface may be configured whereby the pneumatic line exits that part on the opposite side of the flange to that which an external fixture can be fixed.

Both the top and bottom parts may have fixing means including a flat surface for fixing the device to an external fixture.

The or each part with a flat surface may be configured whereby the pneumatic line exits that part parallel to its flat surface and/or whereby the pneumatic line exits that part to line connectors which are positioned flush with the flat surface.

A device according to the present invention may comprise a plurality of pneumatic lines, each coiled around the load bearing body and passing through the top and bottom parts.

The invention will now be described, by way of example only, with reference to the following figures in which.

Figure 1:
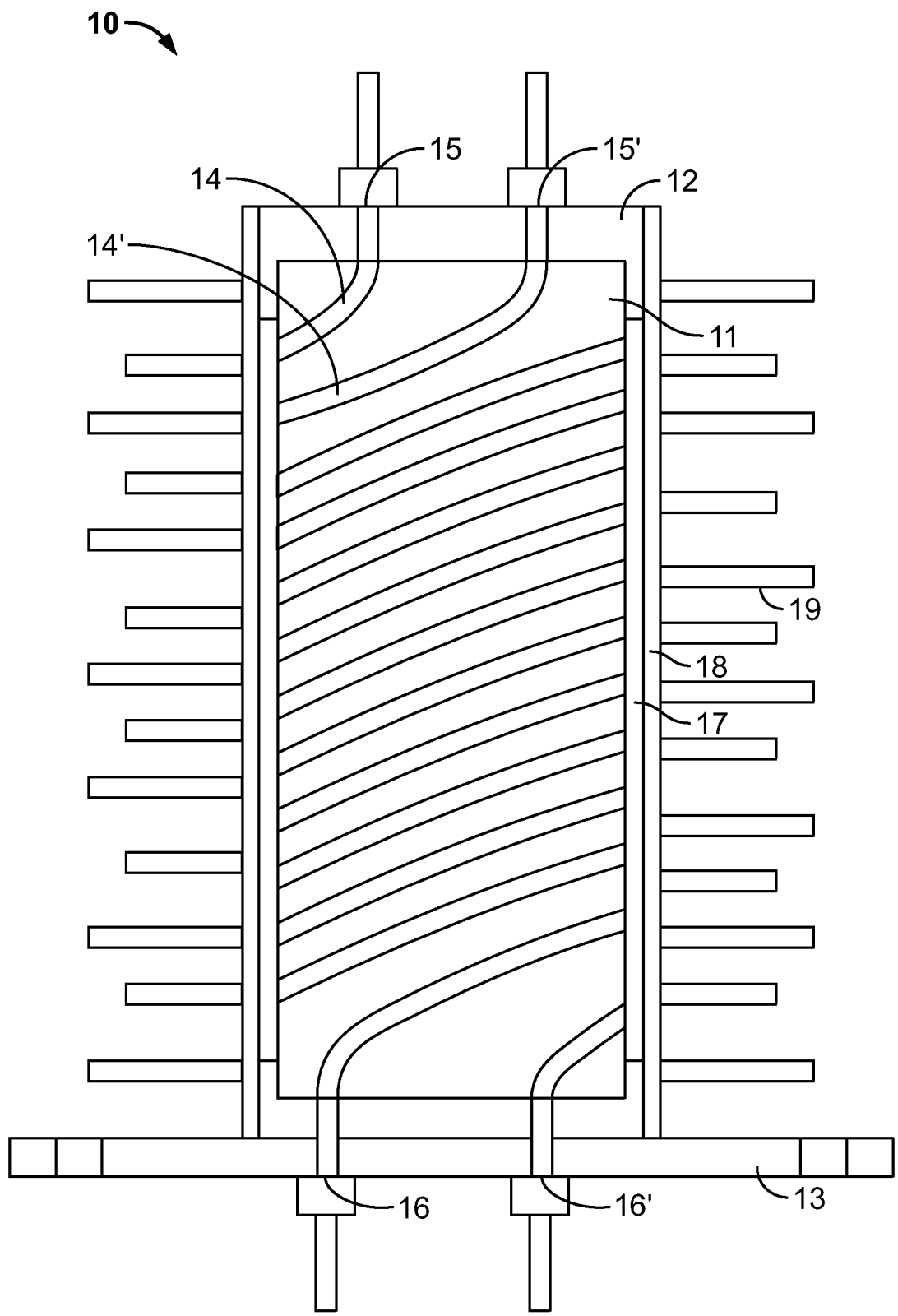
FIG. 1 is an illustrative section through a conventional pneumatic insulating device as described above.
Figure 2:
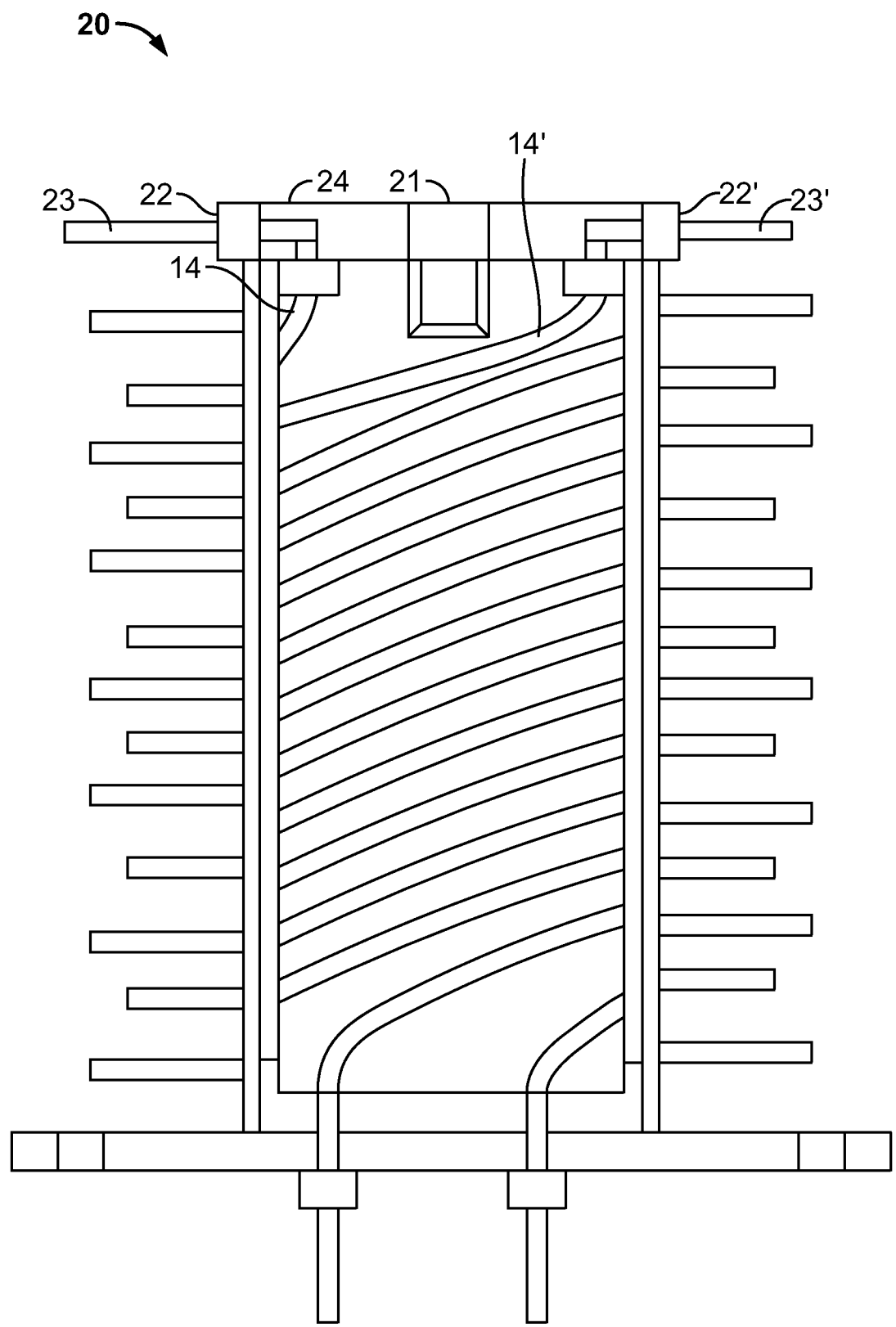
FIG. 2 is an illustrative section through a first embodiment of a pneumatic insulating device according to the present invention.

Referring to FIG. 2, a first embodiment of a pneumatic insulating device 20 according to the present invention is shown. The pneumatic insulating device 20 is similar to the conventional pneumatic insulating device 10 illustrated in FIG. 1 with the difference that the top part 24 is configured in accordance with the present invention.

Specifically, the top part 24 has a flat section and fixing means 21 in the form of an aperture which enables an external fixture (not shown) to be bolted to a threaded bore of the core. Furthermore, the pneumatic lines 14, 14', 23, 23' pass through and exit the top part on the side of the top part, away from its flat section, and parallel to the flat section, thereby avoiding interference with the fixing of an external fixture. The position of the exit of the pneumatic lines 14, 14' from the top part is such that line connectors 22, 22' when fitted to the top part sit flush with the flat surface.

Figure 3:
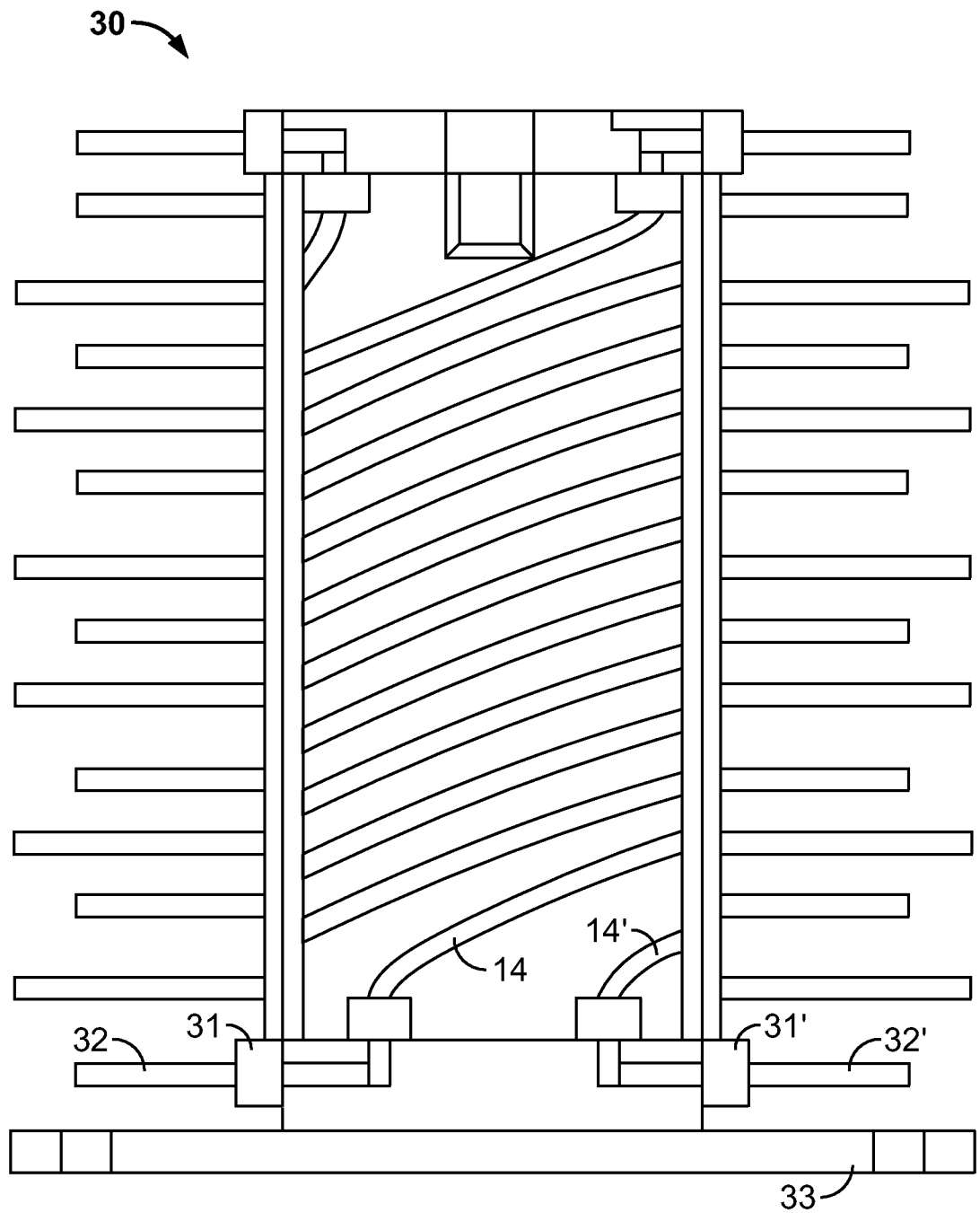
FIG. 3 is an illustrative section through a second embodiment of a pneumatic insulating device according to the present invention.

A second embodiment of a pneumatic insulating device 30 according to the present invention is shown in FIG. 3. This device has the top part of the pneumatic insulating device shown in FIG. 2 and a modified bottom part 33 whereby the pneumatic lines 14, 14' pass through and exit the bottom part on the side of the bottom part, parallel to and away from the flange, and on the opposite side of the flange to that which an external fixture can be fixed.

An pneumatic insulating device in accordance with the present invention could in principle be composed of top and bottom parts from either the embodiments illustrated in FIGS. 2 and 3, or indeed an alternative such part which enables an external fixture to be fitted, and in doing so, not depart from the scope of the present invention.

The invention claimed is:

1. An pneumatic insulating device comprising:
  a load bearing body;
  top and bottom parts connected to the load bearing body, one or both of the top or bottom part having fixing means including a flanged, flat surface for abutting the device to an external fixture; and
  a coiled, insulating pneumatic line connected to and passing though the top and bottom parts, both the top and bottom parts having fixing means for fixing the device between external fixtures;
  wherein the or each part with a flanged, flat surface is configured whereby the pneumatic line exits that part on the opposite side of the flange to that which an external fixture can be fixed.

2. A device according to claim 1, wherein both the top and bottom part have fixing means including a flat surface for fixing the device to an external fixture.

3. An pneumatic insulating device, comprising:
  a load bearing body;
  top and bottom parts connected to the load bearing body, one or both of the top or bottom part having fixing means including a flat surface for abutting the device to an external fixture; and
  a coiled, insulating pneumatic line connected to and passing though the top and bottom parts, both the top and bottom parts having fixing means for fixing the device between external fixtures;
  wherein the or each part with a flat surface is configured whereby the pneumatic line exits that part parallel to its flat surface.

4. A device according to claim 1, wherein the or each part with a flat surface is configured whereby the pneumatic line exits that part to line connectors which are positioned flush with the flat surface.

5. A device according to claim 1, comprising a plurality of pneumatic lines, each coiled around the load bearing body and passing through the top and bottom parts.

6. A device according to claim 1, wherein the bottom part is mounted on a substrate and the top part is connected to and supports an external fixture which requires an insulated pneumatic feed.

7. A device according to claim 3, wherein both the top and bottom part have fixing means including a flat surface for fixing the device to an external fixture.

8. A device according to claim 3, wherein the or each part with a flat surface is configured whereby the pneumatic line exits that part to line connectors which are positioned flush with the flat surface.

9. A device according to claim 3, comprising a plurality of pneumatic lines, each coiled around the load bearing body and passing through the top and bottom parts.

10. A device according to claim 3, wherein the bottom part is mounted on a substrate and the top part is connected to and supports an external fixture which requires an insulated pneumatic feed.

\* \* \* \* \*